Aug. 14, 1928.
A. A. THEODOROPULOS
1,681,069
SAFETY BUMPER FOR VEHICLES
Filed Nov. 26, 1927
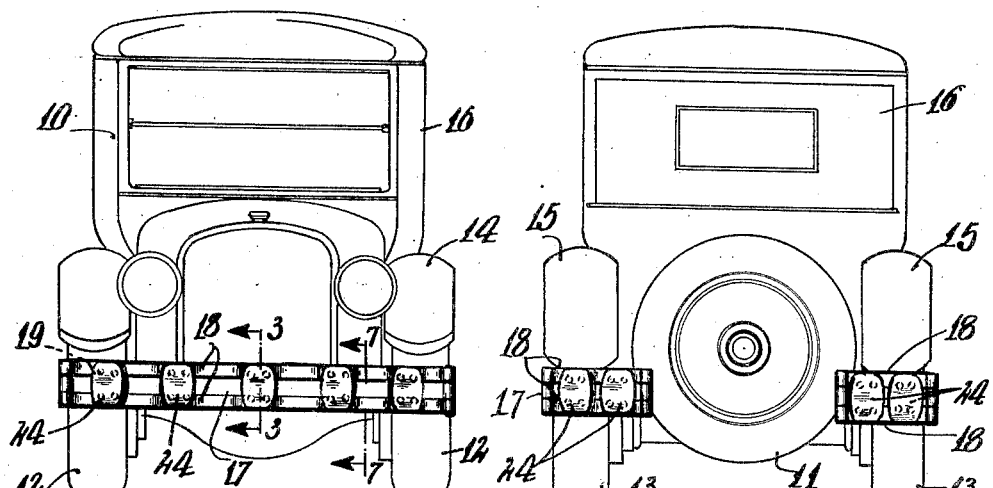
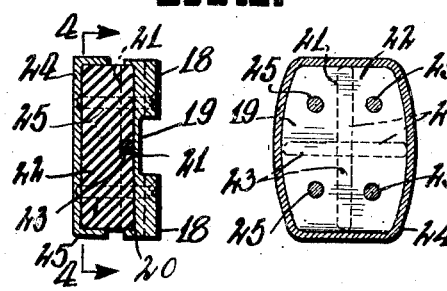
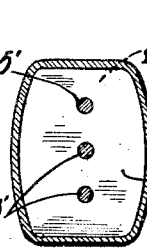
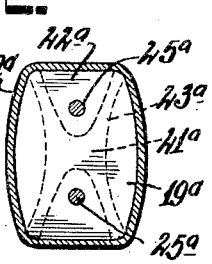
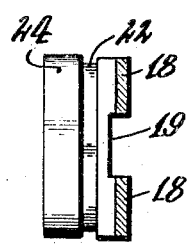
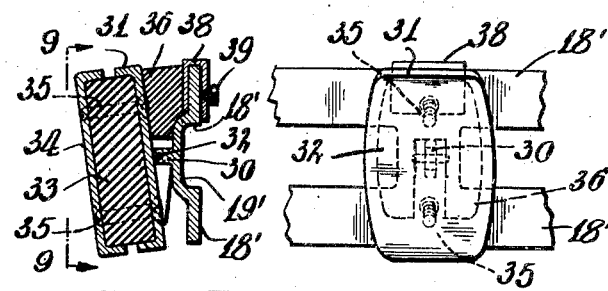

Patented Aug. 14, 1928.

1,681,069

UNITED STATES PATENT OFFICE.

ARISTEDE A. THEODOROPULOS, OF NEW YORK, N. Y.

SAFETY BUMPER FOR VEHICLES.

Application filed November 26, 1927. Serial No. 235,783.

This invention relates generally to automobile bumpers, and has more particular reference to novelly constructed bumper elements thereof.

The invention has for an object the provision of a device of the class mentioned, of simple desirable construction, which can be manufactured and sold at a reasonable cost.

For further comprehension of the invention and of the objects and advantages thereof, reference will be had to the following description and accompanying drawings, and to the appended claims in which the various novel features of the invention are more particularly set forth.

Referring to the accompanying drawing, forming a material part of this disclosure:

Fig. 1 is a front view of an automobile having the invention bumper applied thereto.

Fig. 2 is a rear view of the automobile showing the rear bumpers.

Fig. 3 is a vertical sectional view, taken on the line 3—3 of Fig. 1.

Fig. 4 is a vertical sectional view, taken on the line 4—4 of Fig. 3.

Fig. 5 is a view similar to Fig. 4 but disclosing a modification of the invention.

Fig. 6 is another similar view, disclosing another modification.

Fig. 7 is a vertical sectional view taken on the line 7—7 of Fig. 1.

Fig. 8 is a vertical sectional view similar to Fig. 3 but disclosing a modified form of the invention.

Fig. 9 is a fragmentary front view as seen looking in the direction of arrows 9—9 of Fig. 8.

The reference numeral 10 indicates generally an automobile of any design and construction, provided at its rear with spare tire 11. The automobile illustrated is of the conventional type provided with front wheels 12, rear wheels 13, front mud guards 14, rear mud guards 15 and body 16.

The automobile is provided with front and rear bumpers 17 including a pair of front horizontal bars 18 with integral spaced connectors 19, each being formed with a recessed portion 20 provided with projecting crossed ribs 21. A shock absorber 22, preferably made of rubber, fits into the recessed portion 20, and has crossed grooves 23 engaging the ribs 21. A cap 24 rests on the free end of the shock absorber, and screws 25 hold the cap and shock absorber to the connector 19. The modification illustrated in Fig. 5 discloses the ribs 21 and grooves 23 eliminated from the connector 19' and screws 25' holding the cap 24', the shock absorber 22' and the connector 19' together. Fig. 6 discloses ribs 21ª on connector 19ª engaging in grooves 23ª in the shock absorber 22ª and screws 25ª hold the cap 24ª to the absorber and connector.

Figs. 8 and 9 disclose horizontal bars 18' provided with integral connectors, such as connector 19' which is provided with lug 30. A base bracket 31 is pivotally connected to the lug 30, as at 32. A shock absorber 33 and a cap 34 are secured to the bracket 31 by means of screws 35. The bracket 31 may be inclined with its top remote from the top bar 18' and a wedge-shaped shock absorber 36 with a cut-out 37 for accommodating the lug 30, is forced in between the rear of bracket 31 and the connector 19'. A clamp 38 is attached to the shock absorber 36 and engages the top bar 18' and is held thereon by set screw 39. The bracket 31 may be inclined so that its bottom is remote from the bottom bar 18' and wedge 36 may be inserted upside down, from the bottom, and clamped to the bottom bar 18'.

When the automobile strikes something such as another car, reference being had to light bumping, the shock absorbers 22 which are in front of the bumpers, tend to ease the shock. The modification illustrated in Figs. 8 and 9 discloses adjustable shock absorbers which may be upwardly or downwardly directed, so as to be best adapted to receive upward or downward shocks, as the user of the car sees fit to adjust them.

While I have illustrated and described my invention with some degree of particularity, I realize that in practice various alterations therein may be made. I therefore reserve the right and privilege of changing the details or otherwise altering the arrangement of the correlated parts without departing from the spirit or the scope of the appended claims.

Having thus described my invention, what I claim as new and desire to secure by United States Letters Patent is:

1. An automobile bumper, comprising horizontal bars provided with integral spaced connectors, formed with recesses, shock absorbers fitted in the recesses, caps on top of the shock absorbers, and screws passed through the caps, and absorbers and engaging the connectors.

2. An automobile bumper, comprising horizontal bars provided with integral spaced connectors, formed with recesses, shock absorbers fitted in the recesses, caps on top of the shock absorbers, and screws passed through the caps, and absorbers and engaging the connectors, the connectors being provided with projecting ribs, and the shock absorbers with complementary grooves.

3. In combination with automobile front or rear bumpers including horizontal bars, spaced connectors between the bars, and formed with recesses, shock absorbers fitted in the recesses and caps on top of the shock absorbers.

4. In combination with automobile front or rear bumpers including horizontal bars, spaced connectors between the bars, and formed with recesses, shock absorbers fitted in the recesses, caps on top of the shock absorbers and screws passed through the caps, and absorbers and engaging the connectors.

5. In combination with automobile bumpers having horizontal bars, connectors between the bars, and formed with recesses, rubber blocks fitted in the recesses and projecting therefrom, caps engaged over the free sides of the blocks, screws passed thru the caps, the blocks, and engaging the connectors, and ribs projecting from the said connectors and engaging with complementary grooves in the blocks for aiding in holding the blocks against lateral displacement relative to the said connectors.

In testimony whereof I have affixed my signature.

ARISTEDE A THEODORPULOS.